United States Patent
Huskamp et al.

(10) Patent No.: US 7,607,225 B2
(45) Date of Patent: Oct. 27, 2009

(54) MANUFACTURE OF FLOW OPTIMIZED STIFFENER FOR IMPROVING RIGIDITY OF DUCTING

(75) Inventors: Christopher S. Huskamp, St. Louis, MO (US); Victor Blakemore Slaughter, Manchester, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/162,261

(22) Filed: Sep. 2, 2005

(65) Prior Publication Data
US 2007/0050979 A1    Mar. 8, 2007

Related U.S. Application Data

(63) Continuation-in-part of application No. 10/907,973, filed on Apr. 22, 2005, now Pat. No. 7,509,725.

(51) Int. Cl.
*B21D 51/16* (2006.01)
(52) U.S. Cl. .................................... 29/890.08
(58) Field of Classification Search ............. 29/890.08, 29/455.1, 897.3, 523, 428, 432.1, 437, 463; 454/903; 285/123.16; 264/497
See application file for complete search history.

(56) References Cited

U.S. PATENT DOCUMENTS

| 2,988,334 | A | * | 6/1961 | Vacano et al. ............... 165/111 |
|---|---|---|---|---|
| 3,038,702 | A | | 6/1962 | Trunnell |
| 4,863,538 | A | | 9/1989 | Deckard |
| 5,017,753 | A | | 5/1991 | Deckard |
| 5,132,143 | A | | 7/1992 | Deckard |
| 5,252,264 | A | | 10/1993 | Forderhase |
| 5,342,919 | A | | 8/1994 | Dickens, Jr. et al. |
| 5,549,416 | A | * | 8/1996 | Thomas et al. ............... 405/153 |
| 5,639,070 | A | | 6/1997 | Deckard |
| 5,678,162 | A | | 10/1997 | Barlow et al. |
| 5,733,497 | A | | 3/1998 | McAlea et al. |
| 5,749,041 | A | | 5/1998 | Lakshminarayan et al. |

(Continued)

FOREIGN PATENT DOCUMENTS

EP    0703036 A    3/1996

OTHER PUBLICATIONS

German Document No. XP 000656866, Schmachtenberg, E. et al. "Laser-Sintering of Polyamide", Kunstoffe 87 (1997), pp. 773, 774 and 776, Carl Hanser Verlag, Munich, Germany.

(Continued)

*Primary Examiner*—John C Hong
(74) *Attorney, Agent, or Firm*—Ostrager Chong Flaherty & Broitman P.C.

(57) ABSTRACT

A method for the direct manufacture of aerospace duct elements is provided comprising executing a single build run on a build chamber using direct fabrication technology to generate at least one duct section. The at least one duct section is generated by forming a plurality of partial cylinder duct segments orientated within the build chamber in a nested arrangement during the single build run, and assembling at least two of the partial cylinder duct segments to form the duct section. During the single build run a plurality of stiffening protrusions are formed on each of the partial cylinder duct segments to improve duct rigidity and to modify flow through the duct section.

19 Claims, 3 Drawing Sheets

U.S. PATENT DOCUMENTS

| | | | |
|---|---|---|---|
| 5,990,268 A | 11/1999 | Dickens, Jr. et al. | |
| 6,136,948 A | 10/2000 | Dickens, Jr. et al. | |
| 6,164,370 A * | 12/2000 | Robinson et al. | 165/133 |
| 6,245,281 B1 | 6/2001 | Scholten | |
| 2004/0021256 A1 | 2/2004 | DeGrange et al. | |

OTHER PUBLICATIONS

German Document No. XP 002213140, Keller, Peter "Der Stoff, aus dem die Prototypen sind (Material from which prototypes are made)" Kunstoffe 89 (1999), pp. 58-61, Carl Hanser Verlag, Munich, Germany.

* cited by examiner

MANUFACTURE OF FLOW OPTIMIZED STIFFENER FOR IMPROVING RIGIDITY OF DUCTING

CROSS-REFERENCE TO RELATED APPLICATIONS

This is a continuation-in-part of U.S. patent application Ser. No. 10/907,973 filed on Apr. 22, 2005, now U.S. Pat. No. 7,509,725.

TECHNICAL FIELD

The present invention relates generally to a method for the direct manufacturing of aerospace ducting, and more particularly to a method for the direct manufacturing of aerospace ducting with improved rigidity and flow control.

BACKGROUND OF THE INVENTION

Aerospace and military applications often provide unique challenges to design and manufacturing. The nature of these applications often requires limited run and small-lot productions that result in high cost because of the small quantity of individualized assemblies. Part cost can be extremely expensive due to the cost of tooling and long lead-time associated with developing and fabricating the tooling. By way of example, aerospace environmental control system ducts are commonly laid up using fiberglass lay-up techniques. Reliable and durable tooling is necessitated for this manufacturing technique. When multiple aircraft designs are implemented, then multiple specialized tools and lay-up procedures are also required. This quickly generates negative cost implications on part manufacturing.

Direct manufacturing has the ability to open the doors for short lead time, tool-less manufacturing of aerospace components. Existing applications, however, are frequently limited due to practical and existing size constraints on the build chamber or pool. The usable size on the build chambers commonly limits their application to relatively small-sized parts. Additionally, multi-part elements may require individual builds using direct manufacturing and thereby generate undue cost increases. The present invention seeks a unique methodology of harnessing the direct build methodology while overcoming limitations generated by the limited build chamber sizing. In addition, the present invention seeks a method for producing oversized direct manufacture elements while minimizing the required number of full height builds.

A concern when using direct manufacturing to produce large scale objects such as ducting arises as the desire for larger and lighter duct sections increases. As the duct sections become larger and lighter, the flexibility of the plastic material utilized in direct manufacturing may begin to lose the desired stiffness and rigidity necessary for proper operation. In addition, flow through these duct sections is often a significant factor in performance. It is often desirable to modify such flow to minimize, eliminate, divert, or improve airflow through the duct.

What is needed is a method for manufacturing oversized duct work using direct manufacturing that provided the desirable stiffness and rigidity to duct section. Additionally, it would be highly desirable to have a method of manufacturing such duct segments while simultaneously introducing elements suitable for tailoring the airflow through the duct section.

SUMMARY OF THE INVENTION

In accordance with the present invention a method for the direct manufacture of aerospace duct elements is provided comprising executing a single build run on a build chamber using direct fabrication technology to generate at least one duct section. The at least one duct section is generated by forming a plurality of partial cylinder duct segments orientated within the build chamber in a nested arrangement during the single build run, and assembling at least two of the partial cylinder duct segments to form the duct section. During the single build run a plurality of stiffening protrusions are formed on each of the partial cylinder duct segments during to improve duct rigidity.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
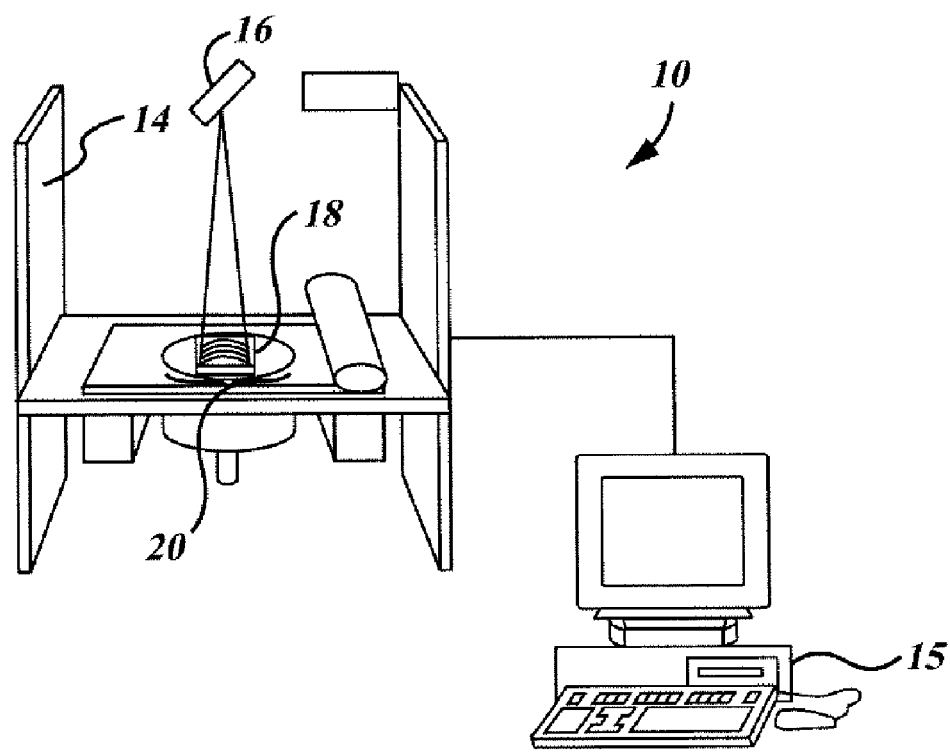
FIG. 1 is an illustration of a method for the direct manufacture of aerospace duct elements in accordance with the present invention.

Referring now to FIG. 1, which is an illustration of a method for the direct manufacture of aerospace elements 10 in accordance with the present invention. The method is intended for the manufacture of oversized elements 12 such as aerospace duct sections or other aerospace cylindrical elements. The method utilizes a direct manufacturing assembly 14 such as a selective laser sintering assembly to generate the aerospace duct elements 12 in a single build run controlled by a computer assembly 15. Selective laser sintering assemblies 14 utilize a laser 16 to directly produce solid structures within a build chamber 18 during the build run. The build chamber 18 (or pool) has a build chamber profile 20 that is commonly too small for the manufacturing of oversized objects during single runs. Although laser sintering has been described, the present invention contemplates other layer build methodologies.

Figure 2:
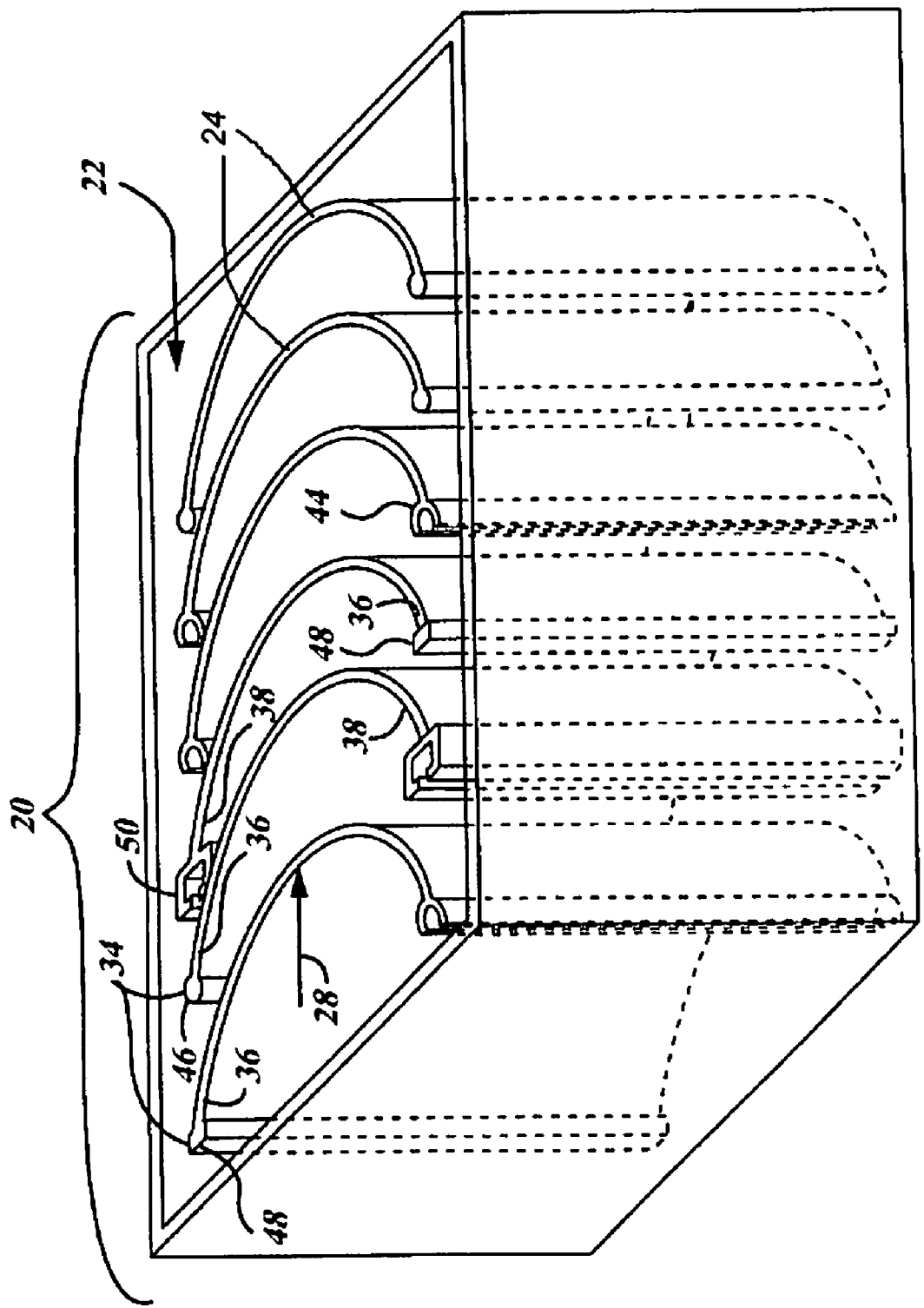
FIG. 2 is a detailed illustration of the build chamber utilized in the direct manufacturing method illustrated in FIG. 1.

The present method bypasses limitations caused by small build chamber profiles 20 by way of forming the aerospace duct sections 12 as a plurality of partial cylinder duct segments 22 (partial cylinder segments, partial segments) formed during a single build run within the build chamber 18. The partial cylinder duct segments 22 are a portion of a cylinder defined by cutting a cylinder parallel to its primary axis. An example of half cylinder duct segments 24 (FIG. 2) is only one of the many contemplated embodiments. The advantage of using these partial segments 22 is that they may have segment effective radii 28 maximized to make most efficient use of the build chamber profile 20. Thus when the partial segments 22 are joined to form the aerospace duct section 12, a resultant duct section 12 can have a duct cross-sectional profile 30 (FIG. 5) significantly larger than the build chamber profile 20.

Although a variety of arrangements may be used to build the plurality of partial cylinder duct segments 22 in a single build run, one embodiment (see FIG. 2) contemplates the use of a nested arrangement of the duct segments 22 during the build run. This will allow a plurality of duct segments 22 to be manufactured simultaneously and even possibly a plurality of duct sections 12. Thus, each build run is maximized for efficiency and cost effectiveness. Additionally, it is contemplated the segment effective radii 28 may be varied such that an even greater number of duct segments 22 may be simultaneously manufactured within the build chamber 18. Additionally, the use of varied effective radii 28 allows the simultaneous production of duct sections 12 with varying duct diameters 32.

Figure 3:
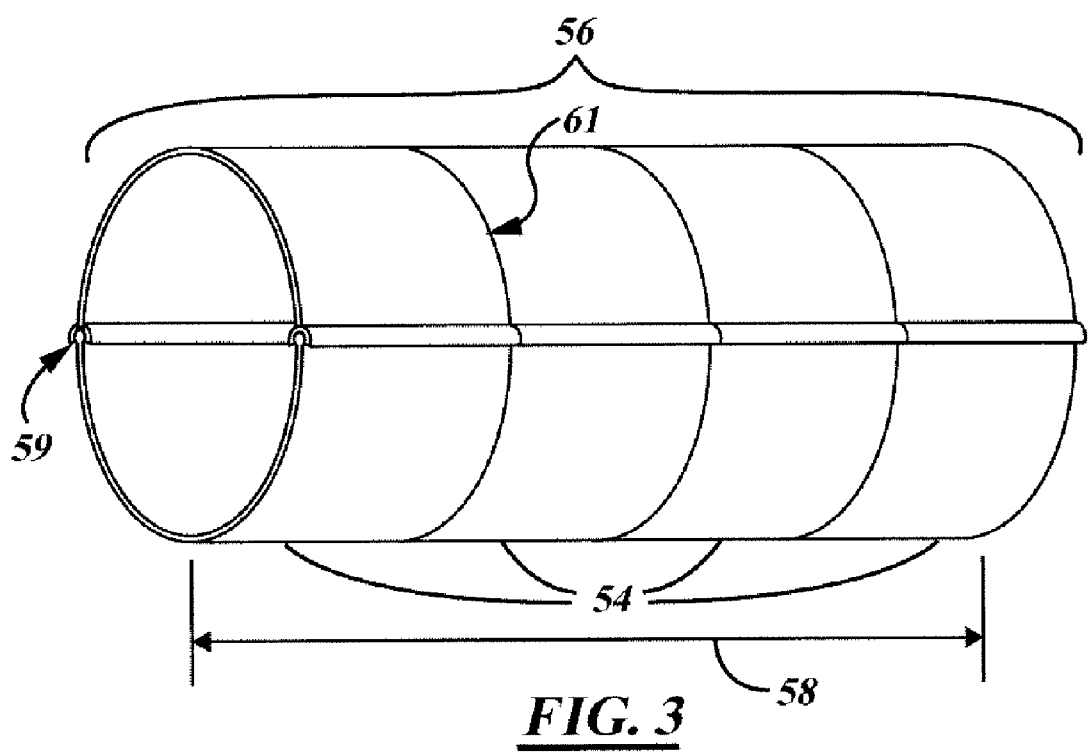
FIG. 3 is a detailed illustration of the assembled duct section assembled from the partial cylinder duct segments manufactured in FIG. 1, the detail illustrating a cup and ball configuration.

It is contemplated that the duct segments 22 may be joined post-build to form each of the duct sections 12. An improvement contemplates the formation of mechanical lock features 34 (FIG. 3) on the first segment end 36 and second segment end 38 of each duct segment 22. These mechanical lock features 34, such as snap-lock features, allow for quick and reliable joining of the segments 22. They also make the duct segments 22 self aligning during assembly to improve assembly and reliability. Although a variety of mechanical lock features 34 are contemplated, two specific contemplated embodiments are illustrated including a cup 44 and ball 46 configuration and a t-tab 48 and t-slot 50 configuration. It should be understood that these, and other, configurations may be utilized together or individually to facilitate ease of assembly. By using these features in combination, it can be assured that assembly can only be made in a single configuration. This insures proper assembly. In addition, a plurality of duct sections 54 may be joined at radial joints 61 to form an elongated duct run 56 with an extended duct length 58.

An issue arises when such large duct sections 54 are generated with regards to stiffness and rigidity. Often, the size when combined with weight restrictions may result in a duct section 54 that is too flexible for design considerations. The present invention, therefore, contemplates the formation of stiffening protrusions 70 formed during the single build run on either the inner surface 74 or the outer surface 72 of each of the duct segments 22 (see FIGS. 4-8). These stiffening protrusions 70 may be specifically designed to produce the desired stiffness and rigidity in the resultant duct section 54. As such, the illustrated embodiments represent only a fractional number of the contemplated embodiments.

In addition to controlling the stiffness and rigidity of the resultant duct section 54, the stiffening protrusions 70 may also be designed to modify flow through the duct section 54. In design specific situations, it may be highly desirable to reduce flow rate, eliminate flow, re-direct flow, straighten flow, or optimize flow in a variety of fashions. The direct build stiffening protrusions 70 may be configured to modify flow through the duct section 54 to achieve any contemplated result.

Figure 4:
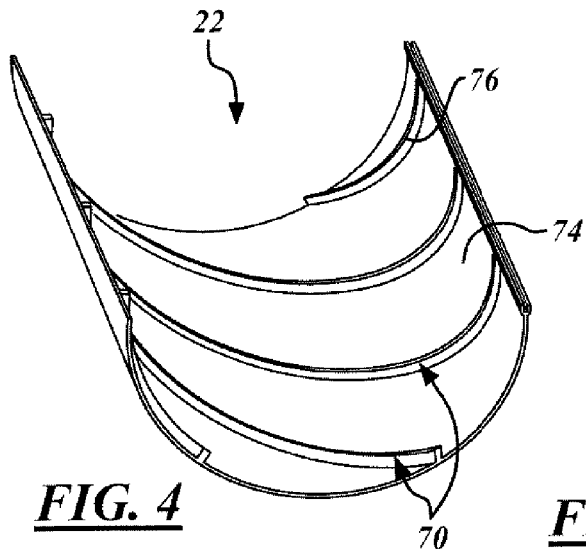
FIG. 4 is a detailed illustration of a duct segment manufactured as illustrated in FIG. 1, the duct segment illustrating a plurality of spiral ridges formed on the inner surface of the partial cylinder duct segment.
Figure 5:
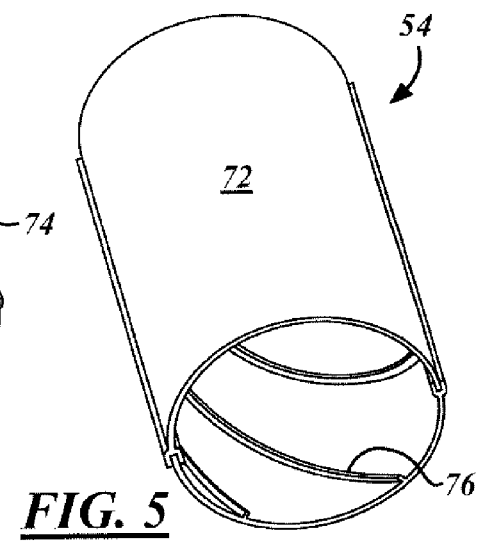
FIG. 5 is an illustration of the assembled duct section assembled form the partial cylinder duct segments manufactured in FIG. 4.
Figure 6:
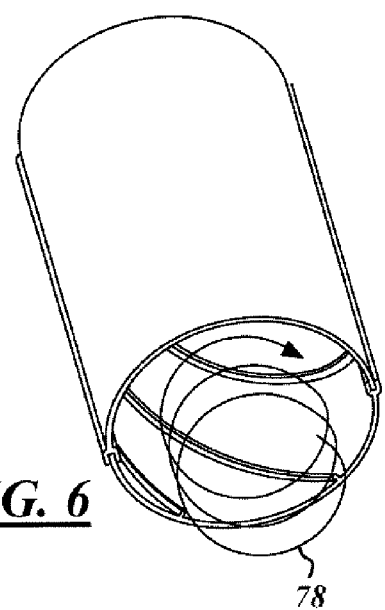
FIG. 6 is an illustration detailing the airflow through the duct section illustrated in FIG. 5.
Figure 7:
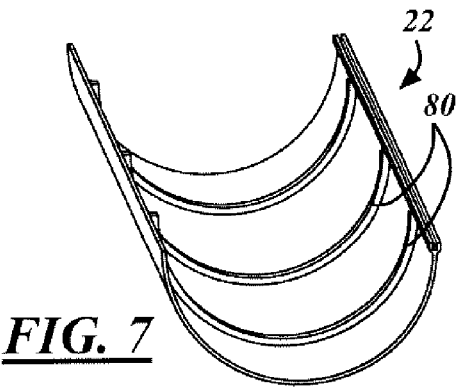
FIG. 7 is an illustration of an alternate embodiment of the partial cylinder duct segment illustrated in FIG. 1, the duct segment illustrating a plurality of ribbed ridges formed on the inner surface.
Figure 8:
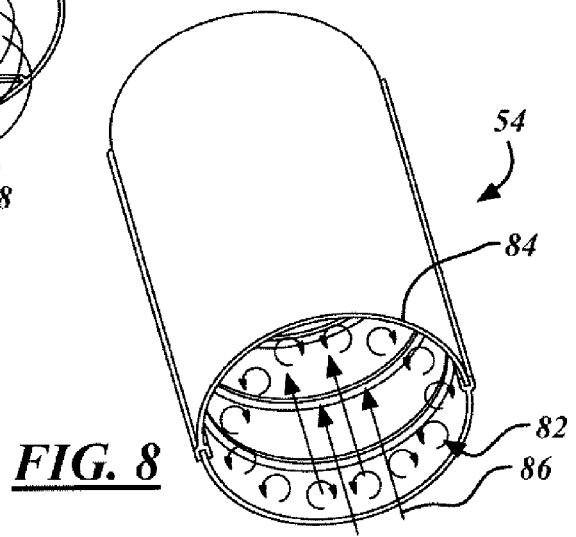
FIG. 8 is an illustration detailing the airflow through a duct section formed using the partial cylinder duct segments illustrated in FIG. 7.

In one embodiment, illustrated in FIG. 4-6, it is contemplated that the stiffening protrusions 70 are formed as spiral ridges 76 on the inside surface 74 of each duct segment 22. In this fashion, when the duct section 54 is formed, flow through the section 54 will induce a vortex flow 78 through the duct section 54. Similarly in FIGS. 7 and 8, the use of simple ribbed ridges 80 or other small protrusions may be utilized to generate a localized turbulent buffer zone 82 around the outer perimeter 84 of the duct section 54. This localized turbulent buffer zone 82 provides a flow buffer than results in a central laminar flow zone 86 down the center of the duct segment 54. In this fashion, or with similar modifications, the present invention utilizes direct manufacturing technology to produce not only structurally improve duct segments 54 but additionally ones with added flow modification characteristics.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method for the direct manufacture of aerospace duct elements comprising: executing a single build run on a build chamber using direct fabrication technology to generate at least one duct section, said at least one duct section generated by: forming a plurality of partial cylinder duct segments orientated within said build chamber in a nested arrangement during said single build run; forming a plurality of stiffening protrusions on each of said partial cylinder duct segments during said single build run; and assembling at least two of said partial cylinder duct segments to form said duct section, said duct section having a duct cross-sectional profile larger than a build chamber profile.

2. A method as described in claim 1, wherein each of said plurality of partial cylinder duct segments includes a first segment end and a second segment end, said first segment end and said second segment end including mechanical lock features adapted to secure said at least two of said partial cylinder duct segments together to form said duct section.

3. A method as described in claim 1, wherein said plurality of stiffening protrusions comprises: a plurality of spiral ridges formed on an inner surface of said partial cylinder duct segments.

4. A method as described in claim 3, wherein said plurality of spiral ridges are configured to generate a rifled flow through said duct section.

5. A method as described in claim 1, wherein said plurality of stiffening protrusions comprises: a plurality of ribbed ridges formed on an inner surface of said partial cylinder duct segments.

6. A method as described in claim 5, wherein said plurality of ribbed ridges: generate a localized turbulent buffer zone immediately adjacent said inner surface; and generate a central laminar flow zone through said duct section.

7. A method as described in claim 1, wherein said plurality of stiffening protrusions are positioned on an inner surface of said partial cylinder duct segments, said plurality of stiffening protrusions configured to modify flow through said duct segment.

8. A method as described in claim 1, wherein said partial cylinder duct segments comprise half cylinder duct segments.

9. A method as described in claim 1, wherein said direct metal fabricating comprises selective laser sintering.

10. A method as described in claim 1, further comprising: generating a plurality of duct segments; and joining said plurality of duct segments to form an elongated duct run.

11. A method for the direct manufacture of aerospace cylindrical elements comprising: executing a single build run on a build chamber using direct fabrication technology to generate at least one cylindrical section, said at least one cylindrical section generated by: forming at least two partial cylinder segments within said build chamber during said single build run; forming a plurality of stiffening protrusions on each of said partial cylinder segments during said single build run and assembling said partial cylinder segments to form said cylindrical section, said cylindrical section having a cylindrical cross-sectional profile larger than a build chamber profile.

12. A method as described in claim 11, wherein each of said partial cylinder segments includes a first segment end and a second segment end, said first segment end and said second segment end including mechanical lock features adapted to secure said partial cylinder segments together to form said cylindrical section.

13. A method as described in claim 11, wherein said plurality of stiffening protrusions comprises: a plurality of spiral ridges formed on of said partial cylinder segments.

14. A method as described in claim 13, wherein said plurality of spiral ridges are configured to generate a rifled flow through said duct section.

15. A method as described in claim 11, wherein said plurality of stiffening protrusions comprises: a plurality of ribbed ridges formed on said cylindrical section.

16. A method as described in claim 15, wherein said plurality of ribbed ridges are configured to: generate a localized turbulent buffer zone immediately adjacent an inner surface of said cylindrical section; and generate a central laminar flow zone through said duct section.

17. An aerospace duct element comprising: at least two partial cylinder duct segments formed during a single build run within a direct fabrication technology build chamber, said at least two partial cylinder duct segments orientated within said build chamber in a nested arrangement during said single build run, said at least two of said partial cylinder duct segments assembled to form a duct section, said duct section having a duct cross-sectional profile larger than a build chamber profile; said partial cylinder duct segments comprising a plurality of protrusions formed on an inner surface of said partial cylinder duct segments during said single build run, said plurality of protrusions stiffening said duct section and modifying flow through said duct section.

18. An aerospace duct element as described in claim 17, wherein said plurality of stiffening protrusions comprises a plurality of spiral ridges configured to generate a rifled flow through said duct section.

19. An aerospace duct element as described in claim 17, wherein said plurality of stiffening protrusions comprises a plurality of ribbed ridges configured to: generate a localized turbulent buffer zone immediately adjacent said inner surface and generate a central laminar flow zone through said duct section.

* * * * *